United States Patent [19]

Nakajima

[11] Patent Number: 5,247,354
[45] Date of Patent: Sep. 21, 1993

[54] NOISE REDUCING APPARATUS FOR REDUCING NOISE IN MOVING VIDEO IMAGE SIGNALS

[75] Inventor: Yukiko Nakajima, Higashiosaka, Japan

[73] Assignee: Matsushita Electric Industrial Co., Ltd., Osaka, Japan

[21] Appl. No.: 690,252

[22] Filed: Apr. 23, 1991

[30] Foreign Application Priority Data

Apr. 23, 1990 [JP] Japan .................................. 2-106758
Apr. 23, 1990 [JP] Japan .................................. 2-106759

[51] Int. Cl.$^5$ ............................................. H04N 5/21
[52] U.S. Cl. ..................................... 358/105; 358/167
[58] Field of Search ........................... 358/167, 105, 36

[56] References Cited

U.S. PATENT DOCUMENTS 5,025,316 6/1991 Darby ................................. 358/167
5,043,807 8/1991 Rabii .................................. 358/105

Primary Examiner—Mark R. Powell
Attorney, Agent, or Firm—Wenderoth, Lind & Ponack

[57] ABSTRACT

A noise reducing apparatus adapted effectively reduces the noise produced in the edge portion during the movement of inputted images may without causing the residual images or the like on the output images even if the inputted images move fast, and even if the inputting images move slowly by the controlling operation of the circuit using the movement detecting circuit especially even when a changing operation is often effected during the movement of the inputted picture signals.

8 Claims, 13 Drawing Sheets

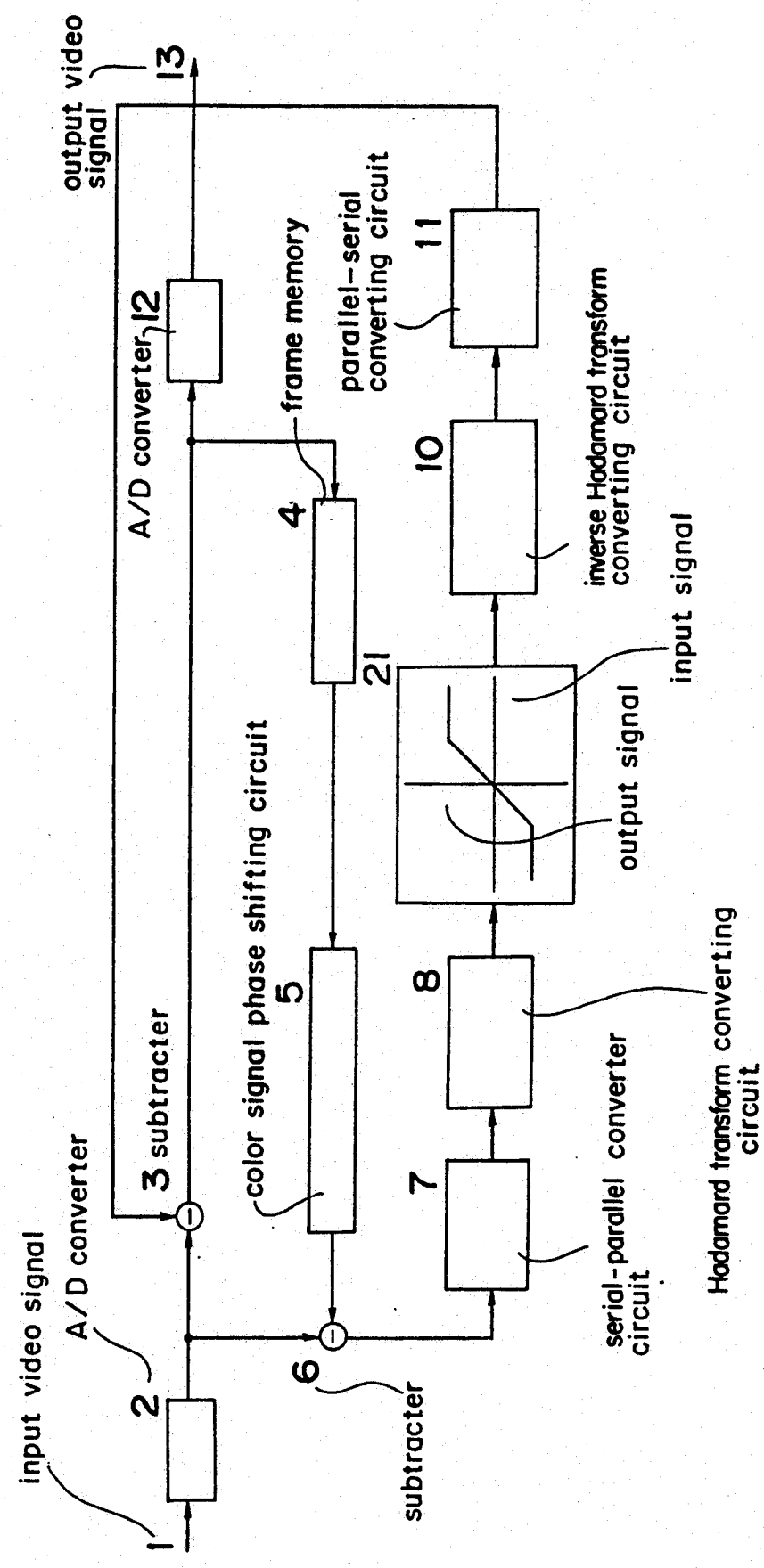

NOISE REDUCING APPARATUS FOR REDUCING NOISE IN MOVING VIDEO IMAGE SIGNALS

BACKGROUND OF THE INVENTION

The present invention relates to a noise reducing apparatus for reducing noise in moving images using the field or frame correlation of video signals of televisions, videos, and video cameras. In this case, the noise may be effectively reduced without causing residual images or the like on the output images even when inputting images having fast movement, and when inputting images having slow movement, by controlling the apparatus using a movement detecting circuit when a changing operation is often effected in the movement of the inputted picture signals. More particularly, the present invention relates to a noise reducing apparatus for effecting the best noise reducing operation with respect to the noise produced in edge portions by the movement of the inputted images by the provision of an optimum value of a nonlinear processing method used in this system.

FIG. 13 is a block diagram showing a conventional noise reducing apparatus.

An input video signal is converted into a digital signal by an A/D converter 2 when the video signal is inputted from the inputting terminal 1. The digital signal subtracted therefrom by has a non-correlated component to be described later passing it through a subtracter 3. The digital signal becomes a picture signal component which ideally does not contain the noise component, and is stored in a frame memory 4, and is delayed by one frame period. Since the picture signal delayed by one frame portion is inverted from one frame signal with respect to the phase of the color signal, it is phase compensated by a color signal phase shifting circuit 5. Only the phase of the color signal is inverted. Thereafter, a difference signal (frame difference signal) of the two picture signals which are equal in chroma phase is obtained by the subtracter 6. The frame difference signal is converted into a parallel digital signal from a serial digital signal by a serial - parallel converter 7. The frame difference signal is divided into the frequency component by a Hadamard transform converting circuit 8. Only the noise component of a small level can be taken out from each of these components through a nonlinear processing circuit 9. The respective components extracted by the nonlinear processing circuit 9 are returned by passing the signal through a the Hadamard transform inverse inverting circuit 10 to the original time axis, where the parallel digital noise signal may be obtained. In a parallel - serial converting circuit 11, the parallel digital noise signal is turned into a serial signal which is similar to the input form. The signal obtained here is a noise component signal extracted only from the frame difference signal which does not have the frame correlation. It is fed into the subtracting circuit 3 as described hereinabove. A digital picture signal free from noise is obtained by the subtracting of the noise components from the input picture signal. Finally, the digital picture signal is converted into the original analog signal and is outputted by the A/D converter 12.

Such an apparatus as described hereinabove has a problem in that the residual images are caused with respect to the moving amount of the input images when the level of the nonlinear circuit is raised so as to improve the S/N improvement degree with the input images being the moving images.

Although the S/N improvement effect and the residual image characteristic of the edge portion visually becomes very different due to the nonlinear processing, the optical characteristics of the nonlinear characteristics are not proposed.

SUMMARY OF THE INVENTION

Accordingly, the present invention has been developed with a view to substantially eliminating the above discussed drawbacks inherent in the prior art, and has for its essential object to provide an improved noise reducing apparatus.

Another important object of the present invention is to provide a noise reducing apparatus for reducing noises without a the deterioration of the input images.

In accomplishing these and other objects, according to one preferred embodiment of the present invention, there is provided a noise reducing apparatus which comprises: a delay means for delaying by a unit time the input picture signal; a first subtracting circuit for obtaining a difference signal between the above described input picture signal and the above described delayed picture signal; a signal characteristics extracting means for analyzing the difference signal into the signal component showing the characteristics; a noise extracting means for extracting the signal of the noise level from the output of the characteristics extracting means; a means for obtaining the moving information of the input picture signal from the input picture signal; a means for controlling the characteristics extracting means so that the output level of the means for extracting the characteristics is small when the moving information obtained is large, and the output level of the means for extracting the characteristics is large when the moving information is small; a second subtracting circuit for subtracting the output signal of the above described noise extracting means from the input picture signal.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1 is a block diagram of a noise reducing apparatus in accordance with a first embodiment of the present invention;

DETAILED DESCRIPTION OF THE INVENTION

Figure 2A:
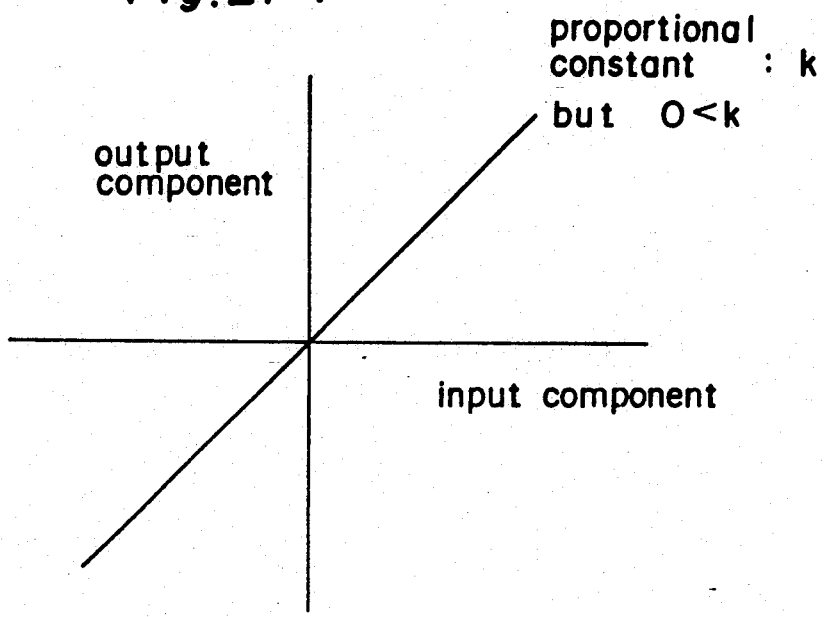
FIG. 2 (a)-2(d) show various types of nonlinear processing characteristics used in the embodiment thereof.
Figure 2B:
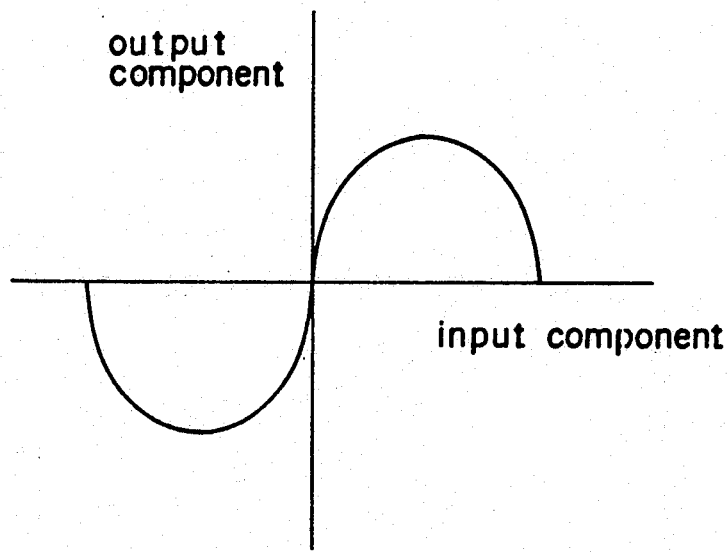
Figure 2C:
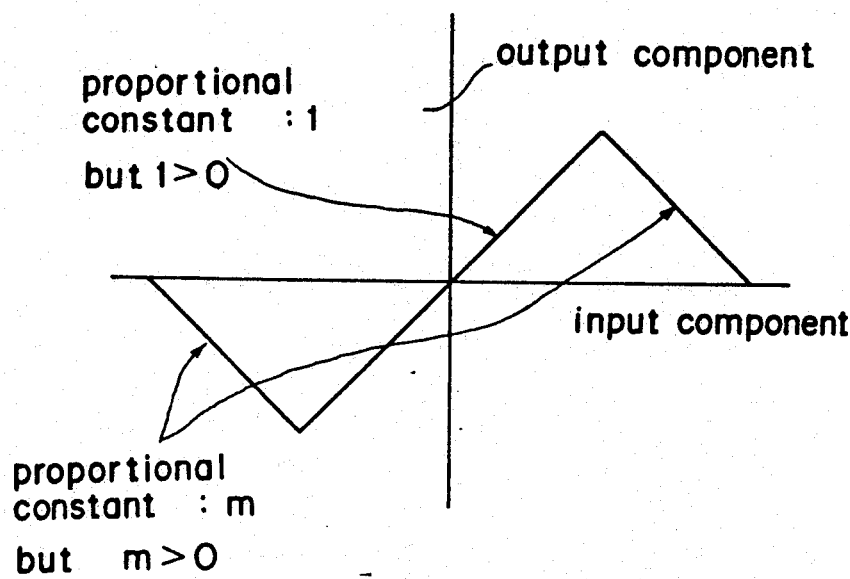
Figure 2D:
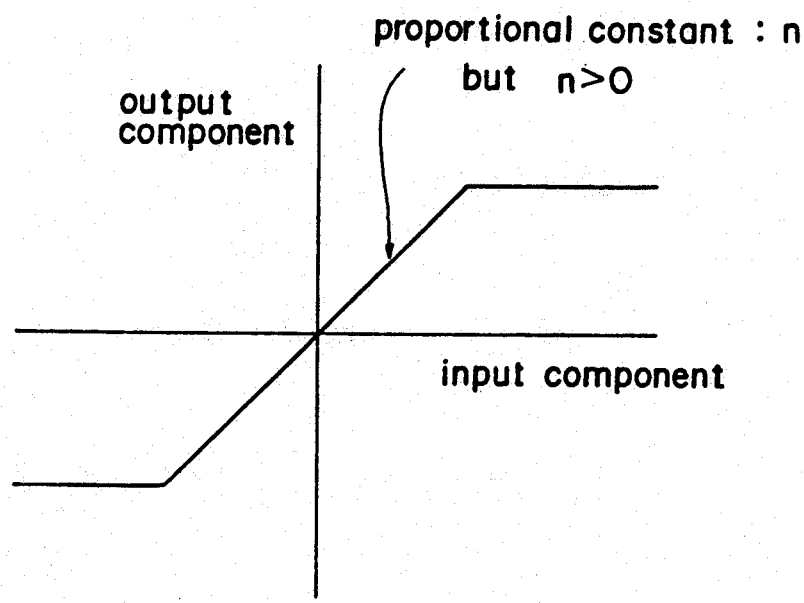

Before the description of the present invention proceeds, it is to be noted that like parts are designated by like reference numerals throughout the accompanying drawings.

Embodiment 1

Figure 13:
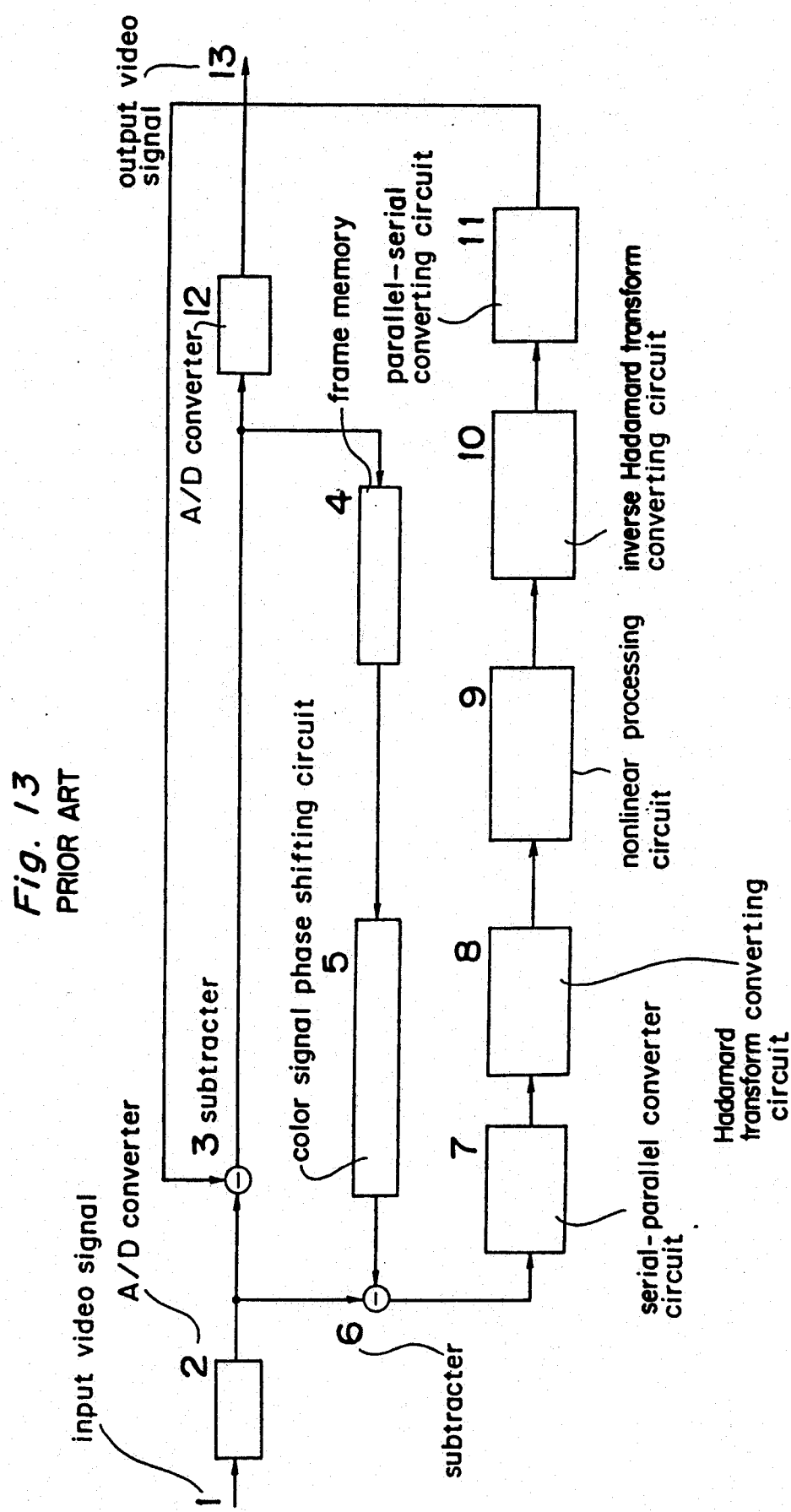
FIG. 13 is a block diagram of a conventional noise reducing apparatus.

FIG. 1 shows a circuit diagram of a noise reducing apparatus in a first embodiment of the present invention. In FIG. 1, the like parts designated by the like reference numerals in FIG. 13 are the same as in FIG. 13 and have the same functions. Reference numeral 21 denotes a nonlinear processing circuit which is adapted to effect the nonlinear processing operation upon the output from the Hadamard transform conversion.

The operation of the noise reducing apparatus of the present embodiment constructed as described hereinabove is described hereinafter. When the video picture signal is inputted from the input terminal 1, the signal is converted from an analog signal to a digital signal by the A/D converter 2. The nonlinear correlation component from the picture signal of one frame before is subtracted from the input picture signal by the subtractor 3 to produce a different signal which and becomes ideally a picture signal free from the noise component. The picture signal component is stored in the frame memory 4, and is delayed by the period of one frame. Since the color signal of the NTSC color picture signal is inverted in phase for each one frame, a color signal phase shifting circuit 5 compensates for it. It only inverts the phase of the color signal of the picture signal delayed in the frame memory 4. The difference signal is obtained by the subtractor 6. The frame difference signal is a signal wherein a signal component (namely, those moving component) which is not frame correlated and the noise component are combined. The frame difference signal is converted into a parallel digital signal from a serial digital signal by the serial - parallel converter 7. The Hadamard transform converting circuit 8 divides the frame difference signal into a low-pass frequency component, a longitudinal frequency component, a lateral frequency component and so on. Since the respective components are the noise component and the moving component, only the noise component of a small level may be taken out from the respective components by passing the signal through the nonlinear processing circuit 21. Since the respective components extracted from the nonlinear circuit are obtained by a Hadamard transform conversion, it is returned to original time axis by the passing the signal through the inverse Hadamard transform converting circuit 10 so as to obtain a parallel digital noise signal. In the parallel - serial converting circuit 11, the parallel digital noise signal is turned into a series digital signal which is similar in form the input signal. The signal is fed into the subtracting circuit 3 as described hereinabove and a digital signal free from the noise is obtained by the subtraction from the input signal. Finally, the digital picture signal is converted into the original analog signal and is outputted by the A/D converter 12.

In the preset embodiment, the operation may be effected using a field memory.

The signal is not required to be restricted to the NTSC composite signal. It is clear that the composition may be effected even with a base band signal. It is to be noted that the color signal phase shifting circuit becomes useless.

The nonlinear processing characteristic 21 of the noise reducing apparatus of the above described construction may be described in detail. Generally, the characteristics of the nonlinear circuit are variable as shown in FIGS. 2 (a) through (d). The characteristics of the nonlinear processing to be considered in principle are in that as a rule, the positive output is effected with respect to the input of the positive value, the negative output is effected with respect to the negative input. In principle, a numerical S/N improvement may be expected with respect to these nonlinear processing characteristics. It has been found that the nonlinear characteristics are related to the visual evaluation of the residual characteristics.

In the processing characteristic shown in FIG. 2 (a), an input level is a product of an input component multiplied by a constant k (k>0) According to experiments 0 using the processing circuit, there is a problem in that the edge becomes dim and unclear in the edge portion where there is a level difference. The nonlinear processing characteristic shown in FIG. 2 (b) is approximately a sine curve, and the 0 level is outputted at a constant level or more or at a constant level or less. According to experiments using the nonlinear processing circuit, the edge where there is a small level difference is likely to become dim, with a problem in that the noise flickers near the edge. With the constant input level, a nonlinear processing characteristic shown in FIG. 2 (c) outputs an output level which is a product of the input level multiplied by the constant n (n>0). The output level is a product in the input signal multiplied by the constant m(m<o). According to experiments using the nonlinear processing circuit, the edge where there is a small level difference is likely to become dim as almost similar to FIG. 2 (b), with noise flickering near the edge. In the nonlinear processing shown in FIG. 2 (d), on output level is the product of the input level multiplied by the constant i (i>0) up to a constant input level, the approximately constant value A or a value which is a product of an input level multiplied by a constant c (i>|c|>0) at the reference level a or more, a value proportional to d (i>|d|>0) is outputted with respect to the approximately constant value B or the input signal at a standard level b or less. According to experiments using the nonlinear processing circuit, it is confirmed that there are no dim edges which has been seen in the processing circuit or there is no noise flickering in the edge portion. The best results are obtained visually by the nonlinear processing method of FIG. 2 (d) by the experiment of the present invention which is about what is considered to be most effective in principle.

The present invention proposes the characteristics of the nonlinear processing circuit of FIG. 2 (d).

Embodiment 2

Figure 3:
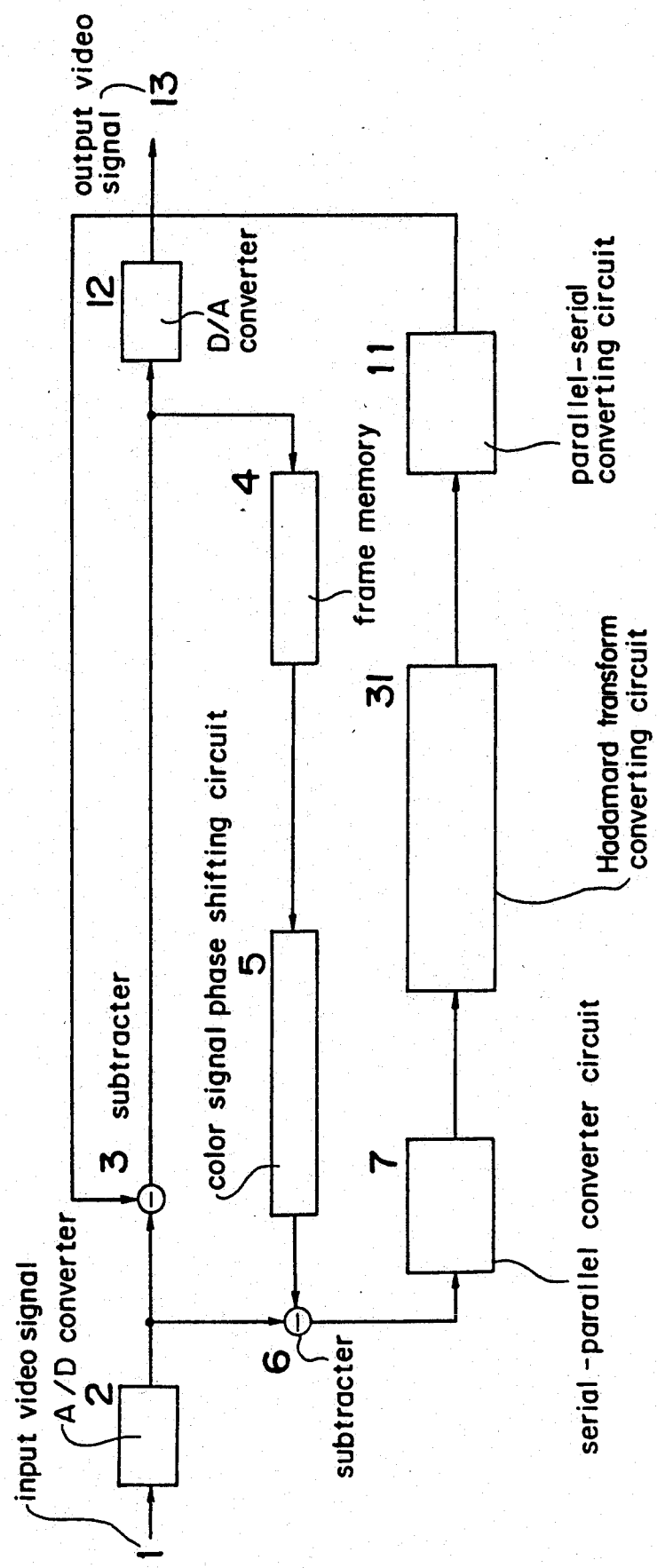
FIG. 3 is a block diagram of a noise reducing apparatus in accordance with a second embodiment of the present invention.
Figure 4:
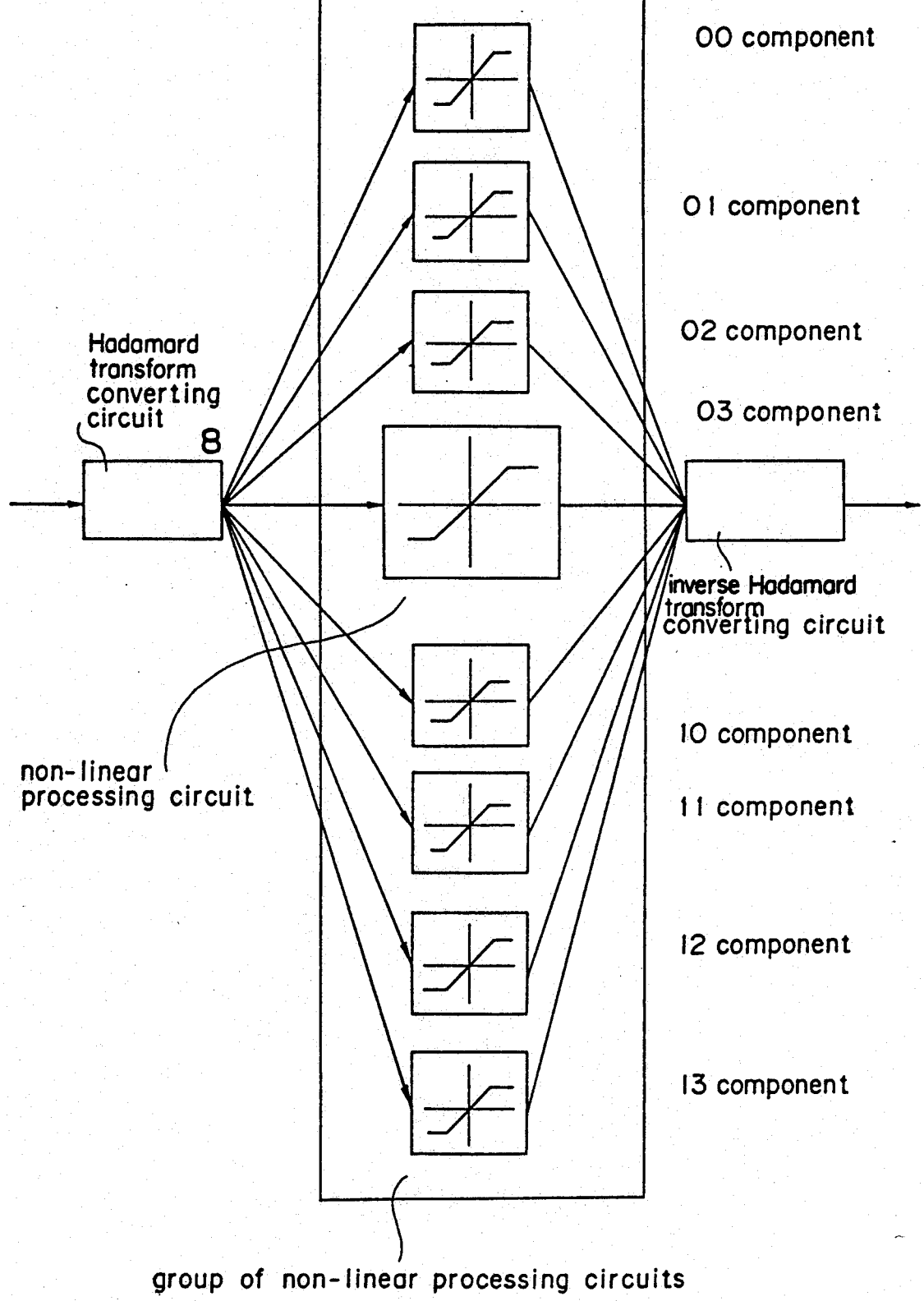
FIG. 4 is a block diagram of a Hadamard transform converting circuit group.

FIG. 3 and FIG. 4 show a circuit diagram of a noise reducing apparatus in accordance with a second embodiment of the present invention. Referring to FIG. 3 and FIG. 4, the parts which have the same reference numerals are the same and have the same functions. Reference numeral 31 denotes a Hadamard transform conversion circuit group, with the details thereof being shown in FIG. 4. The nonlinear circuit group of reference numeral 32, where the respective nonlinear processing are effected with respect to a plurality of outputs from the Hadamard transform converting circuit, are the nonlinear processing circuit group for respectively effecting the different nonlinear processing.

The respective nonlinear processing circuits of the nonlinear processing circuit group is more effective than the experiment of the present invention in the processing method of FIG. 3 (d) shown in Table 1. The respective nonlinear processing circuits output output values which are a product of a certain input signal multiplied by the constant in (in>0) with respect to a certain input level, outputs an approximately constant value An or a value which is a product of an input signal multiplied by a constant cn (in>|Cn|>0) in a standard level an or more, an approximately constant value Bn or a value which is a product of an input signal multiplied by a constant Dn (in>|kn|0) in a standard level bn or lower.

The operation of the noise decreasing apparatus in the present embodiment constructed as described hereinabove is described hereinafter. When the picture signal is inputted to the input terminal 1, the signal is converted from an analog signal into a digital signal by and A/D converter 2. The difference between the picture signal of one frame before and the input picture signal is obtained by the subtractor 3, so that the non-correlated component is subtracted. Ideally the signal becomes a picture signal which does not contain the noise component. The picture signal component is stored in the frame memory 4, and is delayed by one frame. The color signal of the NTSC color picture signal is inverted in phase for each one frame. Only the color signal of the picture signal delayed by the frame memory 4 is inverted in phase; with reference numeral 5 designates a color signal phase shifting circuit for compensating for the phase inversion. The difference signal (frame difference signal) of two picture signals is obtained by the subtracter 6. The frame difference signal is a signal with the signal component (namely, the moving component) having no frame correlation and the noise component being combined. The frame difference signal is converted into a parallel digital signal from the serial digital signal by the serial-parallel converter 7. The frame difference signal is divided into a plurality of components such as a low-pass frequency component, longitudinal direction frequency component, lateral frequency component and so on by the Hadamard transform converting circuit 8. Since the respective components are a noise component and a moving component, only the noise component of a small level is removed from the respective components by the passing through the group of nonlinear processing circuits 32 into the respective components. The characteristics of the Hadamard transform converting output is described below in detail.

Generally the picture signal is characterized in that the movement is more in the movement of the lateral direction, and is less in the movement of the longitudinal direction. Therefore, it is better to eliminate most of the noise component of the nonlinear circuit output even if the moving component is a little mixed with respect to the longitudinal direction movement component. Therefore, it is desirable to set the standard levels bn and cn high. The residual image deterioration in the longitudinal direction becomes a little large, with no problem in the output images. The high S/N improvement may be effected. On the other hand, the nonlinear circuit is better to have less mixture of the moving component with respect to the lateral movement component if the extraction capability of the noise component decreases. Accordingly, it is desirable to set the reference level bn and cn low. Thus, although the S/N improvement capability decreases, the residual image phenomena may be controlled. The nonlinear processing of the different characteristics corresponding to the respective characteristic components is effected from the respective components analyzed into the Hadamard transform converted characteristic component so as to extract the noise component. Since the respective components extracted from the respective nonlinear circuits are obtained by the Hadamard transform conversion, they are returned to the original time axis by the passing through the inverse Hadamard transform converting circuit 10, and a parallel digital noise signal may be obtained here. In the parallel - serial converting circuit 11, the parallel digital noise signal is converted into a serial digital signal similar to the input form. The signals obtained here have the noise components extracted from approximately the frame difference signal. The signal is fed into the subtracting circuit 3 as described hereinabove. The digital signal which does not include the noise is obtained by the subtracting from the input signal. Finally, the digital picture signal is converted into the original analog signal by the A/D converter 12 and is outputted.

The embodiment may be effected even with the use of the field memory.

Also, it is not necessary to be restricted to the NTSC composite signal. Clearly it may be composed even with the base band signal. In this case, the color signal phase shifting circuit becomes unnecessary.

Embodiment 3

Figure 5:
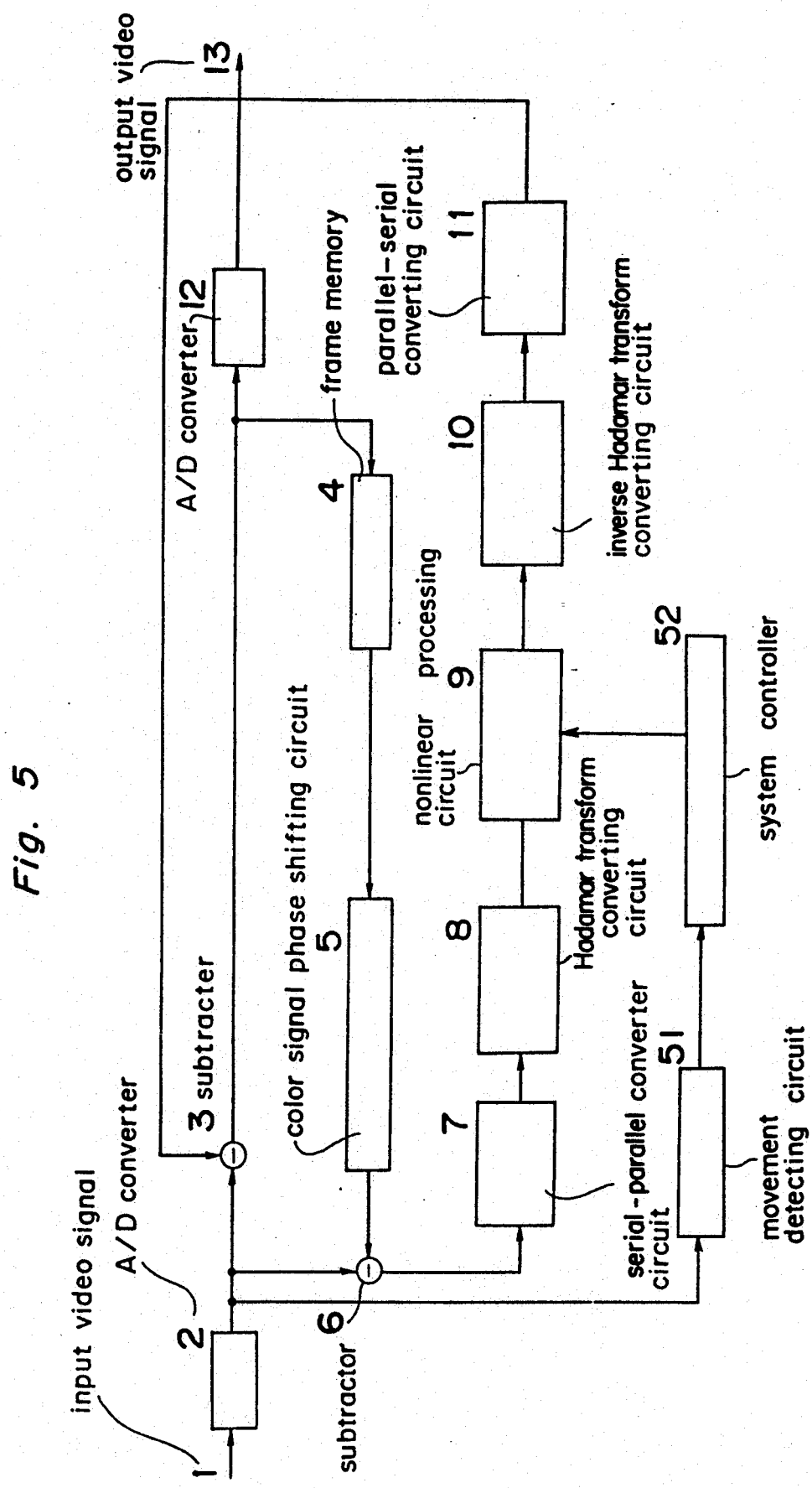
FIG. 5 is a block diagram of a noise reducing apparatus in accordance with a third embodiment of the present invention.

FIG. 5 shows a circuit diagram of a noise reducing apparatus of a third embodiment. In FIG. 5 elements 1 through 13 are similar to elements 1 through 13 shown in FIG. 13 and have the same functions. Reference numeral 51 denotes a movement detecting circuit for obtaining the movement amount of the input images to detect the moving information. Reference numeral 52 denotes a system controller for receiving the moving information of the movement detecting circuit to control the nonlinear characteristics of the nonlinear circuit 9.

The operation of the noise reducing apparatus of the present embodiment composed as described hereinabove is described hereinafter. When the composite picture signal is inputted to the input terminal 1, it is converted into a digital signal from the analog signal through sampling by 4 fsc (a case of 3 fsc may also be considered) by the A/D converter 2. The signal enters the following signal processing system. By the passing through the subtracter 3, the non-correlated component described later is subtracted and the resultant signal ideally becomes a signal component which does not include the noise component. The signal component is stored into the frame memory 4 and is delayed by one frame. Since the color signal is inverted in phase with respect to the next frame, the phase of the color signal is inverted by the phase shifting circuit 5 and the frame difference signal of two signals is obtained by the subtracter 6. The frame difference signal becomes a signal with the signal component which has no frame correlation and the noise component being combined. The frame difference signal is converted into a parallel digital signal from a serial digital signal by the serial - parallel converter 7. The frame difference signal is divided into a low-pass frequency component, a longitudinal direction frequency component and a lateral direction frequency component and so on in the Hadamard transform converting circuit 8. Since the noise which is included in the frame difference signal has no correlation, it is dispersed approximately equally in the frequency distribution of eight components of the output of the Hadamard transform converting circuit 8. Since the noise level in the output of the Hadamard transform converting circuit 8 corresponds to the noise level of the input signal as known, only the noise component of a small level is eliminated from the respective components through the nonlinear processing circuit 9. The output from the A/D converter 2 is input to the movement detecting circuit so as to obtain moving information as to whether the input picture signal is a still picture or a moving picture or whether the movement is fast or slow or the like when the input picture signal is the moving picture. The moving information is inputted into the system controller 52. The system controller 52 controls the characteristics of the nonlinear circuit 9 in accordance with the amount of movement. Since the recursive filter is used in the noise reducing apparatus, the noise reducing effect is good since the level of the characteristics of the nonlinear circuit 9 is larger (at a level which does not exceed 1) for a still picture. But when the input picture is a moving image, the residual images are likely to be produced when the level of the nonlinear circuit is larger since the recursive filter is used. Also, the movement of the moving image is faster with the input image being the moving image, so that the residual images are likely to appear in the output signal.

Figure 6:
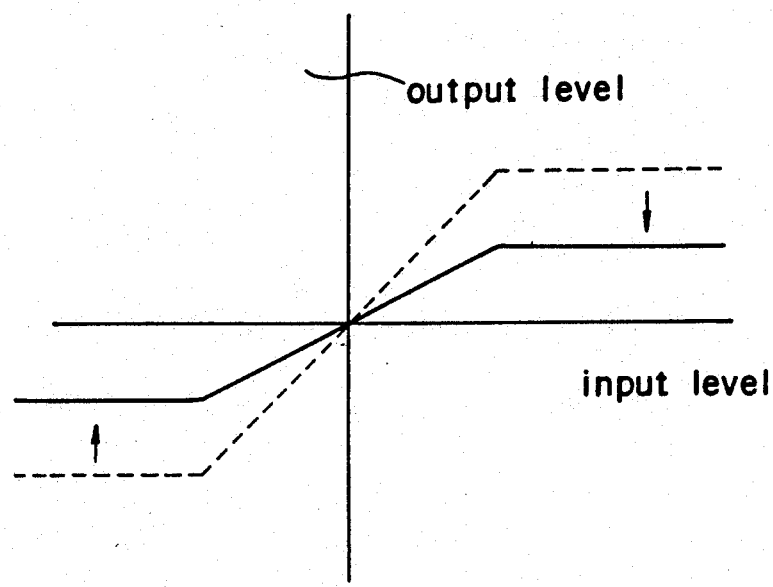
FIG. 6 illustrates a nonlinear processing method.
Figure 7:
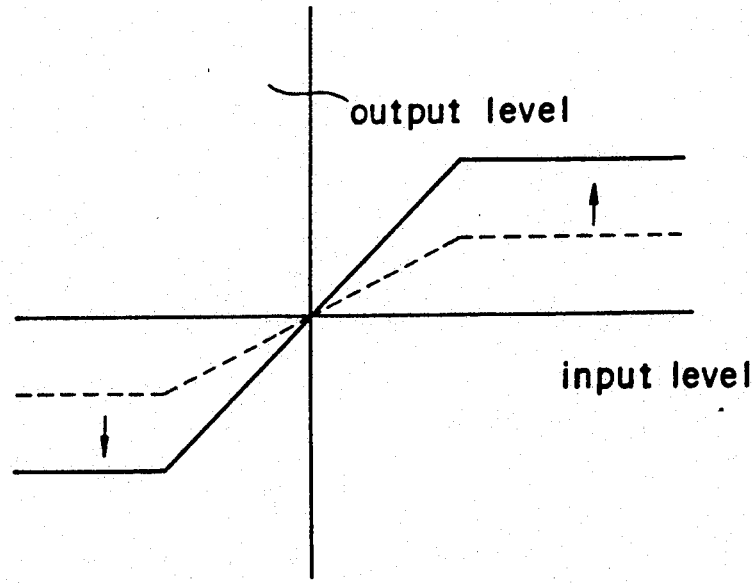
FIG. 7 illustrates a nonlinear processing method.

The system controller 52 receives the information of the movement detecting circuit 51 to increase the characteristics of the nonlinear circuit as shown in FIG. 7 in the case of an input image having a slow moving amount to effect the SN improvement effectively, and to decrease the characteristics of the nonlinear circuit as shown in FIG. 6 in the case an input image having a fast moving amount to effect the SN improvement so as to effect the noise removing operation without the deterioration in the input images. The nonlinear circuit of FIG. 6 and FIG. 7 is assumed to have a noise level of a constant level, and outputs a constant level at a constant or more. As the signal extracted by the nonlinear processing circuit 9 which has received the control from the system controller 52 is adapted to be obtained by the Hadamard transform conversion, it is returned to the original time axis by the passing through the inverse Hadamard transform converting circuit 10, where the parallel digital noise signal may be obtained. In the parallel - serial converting circuit 11, the parallel digital noise signal is turned into a serial digital signal as in the input signal. The signal obtained here is one in which the noise component is only extracted from the frame difference signal which does not have a frame correlation, and is fed to the subtracting circuit 3 as described hereinabove. By the drawing of the noise component from the input luminance signal, a digital luminance signal which has no noise is provided. The digital image signal is converted into the original analog signal and outputted by the A/D converter 12.

In the present embodiment, the same thing may be carried out even with a field memory although the frame memory is used.

Embodiment 4

Figure 8:
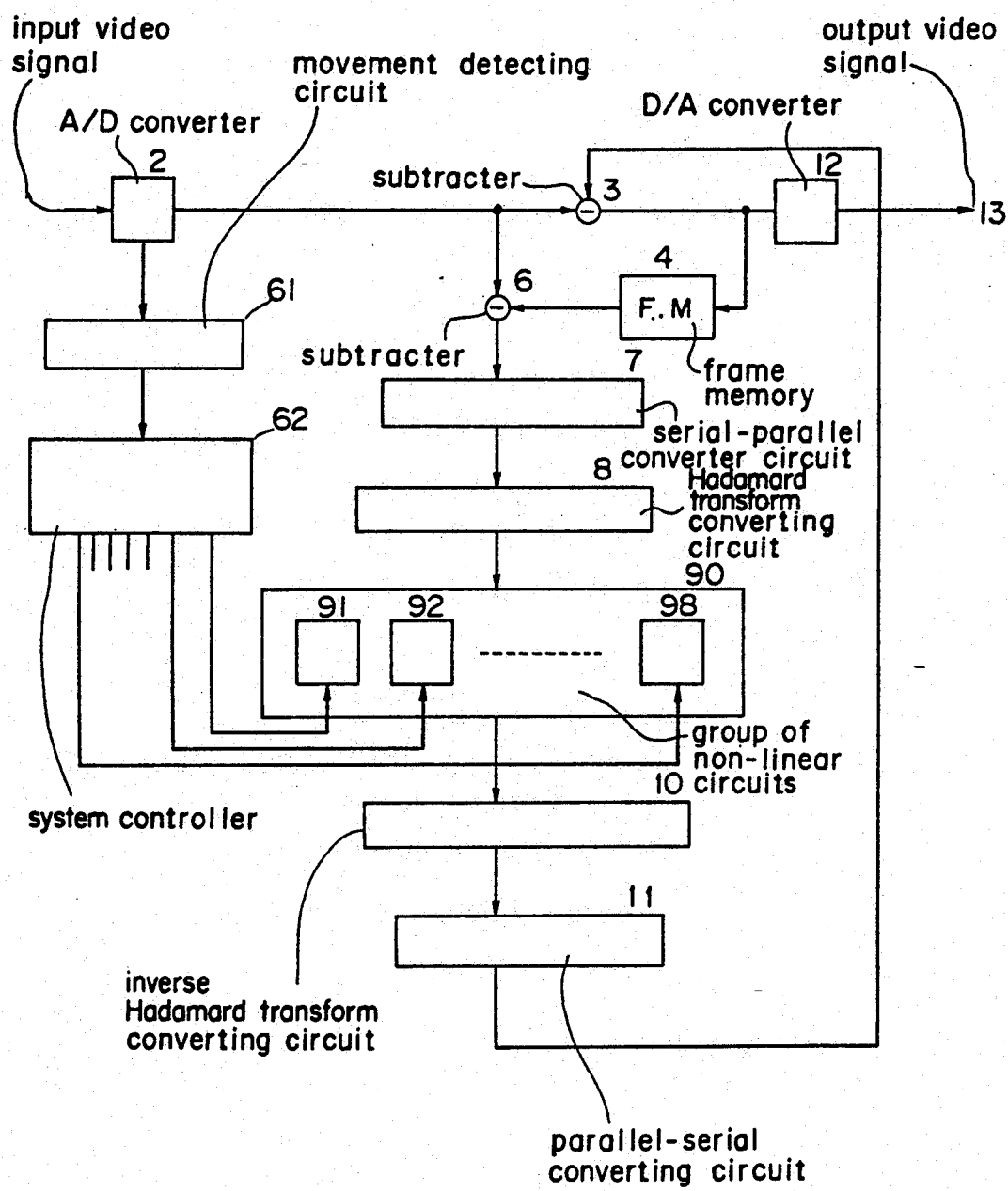
FIG. 8 is a block diagram of a noise reducing apparatus in accordance with a fourth embodiment of the present invention.

FIG. 8 shows a circuit diagram of a noise reducing apparatus of a fourth embodiment, with a plurality of the nonlinear characteristics of the first embodiment being considered. Elements 1 to 13 in FIG. 8 are similar to elements 1 to 13 shown in FIG. 13 and have the same functions. Reference numeral 31 denotes an input terminal for inputting the picture signal of the composite signal. Reference numeral 61 denotes a movement detecting circuit for obtaining the moving amount of the input image so as to detect the moving information. Reference numeral 62 denotes a system controller for receiving the moving information of the movement detecting circuit so as to control the nonlinear characteristics of the group of nonlinear circuits 90. Reference numeral 34 denotes an output terminal for outputting the composite picture signals.

The operation of the noise reducing apparatus in the present embodiment constructed as described hereinabove is described hereinafter. When the composite picture signal is inputted from the input terminal 1, the signal is sampled by 4 fsc (3 fsc may be considered) by the A/D converter 2, and is converted from an analog signal to a digital signal. The signal enters the following signal processing system. The non-correlated component to be described later is subtracted by the passing through the subtracter 3, and the signal ideally becomes a signal component which does not include the noise component. The signal component is stored into the frame memory 4, and is delayed by one frame. Since the color signal is inverted in phase with respect to the next frame, the phase of the color signal is inverted by the phase shifting circuit 5 and the frame difference signal of two signals is obtained by the subtracter 6. The frame difference signal becomes a signal with a signal component which has no frame correlation and the noise component being combined. The frame difference signal is converted into a parallel digital signal from a serial digital signal by the serial - parallel converter 7. The frame difference signal is divided into a low-pass frequency component, a longitudinal direction frequency component and a lateral direction frequency component and so on in the Hadamard transform converting circuit 8. Since the noise which is included in the frame difference signal has no correlation, it is dispersed approximately equally in the frequency distribution of eight components of the output of the Hadamard transform converting circuit 8. Since the noise level in the output of the Hadamard transform converting circuit 8 corresponds to the noise level of the input signal as known, only the noise component of a small level may be removed from the respective components through a plurality of nonlinear processing circuits 90.

The output from the A/D converter 2 is putted to the movement detecting circuit so as to obtain the comprehensive moving information as to whether the input picture signal is a still picture or a moving picture or whether the movement is fast or slow or whether the moving direction is longitudinal or lateral or the like when the input picture signal is the moving picture. The moving information is inputted into the system controller 62. The system controller 62 controls the characteristics of a plurality of nonlinear circuits 90 in accordance with the moving amount, the moving direction and so on. Since a recursive filter is used in the noise reducing apparatus, the noise reducing effect is good since the level of the characteristics of a plurality of nonlinear circuits 90 is larger (at a level which does not exceed 1) in the still picture. But when the input picture is a moving image, the residual images are likely to be produced since the level of a plurality of nonlinear circuits is larger since the recursive filter is used. Also, the movement of the moving image is faster where the input image is a moving image, so that the residual images are likely to appear in the output signal. The Hadamard transform converted frame difference signal is analyzed into eight components as described hereinabove. The respective eight components are a low-pass component, a longitudinal direction detail component, a lateral direction detail component, an oblique direction component so as to show the value corresponding to the moving amount of the input signal. The movement detecting circuit 61 detects whether the input picture signal is a moving image or a still image whether the movement is longitudinal or lateral, and whether the movement is fast or slow when the signal is a moving image to send the moving information of the input picture signal to the system controller 62. The system controller 62 controls (the nonlinear processing circuit is not restricted to eight circuits) the level of the nonlinear processing of a plurality of nonlinear circuits 91 through 98 from the moving amount, the moving direction of the input picture signal which is the output of the movement detecting circuit. When the input picture signal is the still image, the system controller 62 increases the output processing level of the nonlinear circuits 91 through 98 as described in FIG 7. When the input picture signal is the moving image, the system controller 62 reduces the output processing level of the nonlinear circuits 91 through 98 a shown in FIG. 6. The value of the nonlinear circuit is varied through the moving amount of the input signal in this manner so as to effect the S/N improvement more when the movement is less. When the moving amount is more, the output of the nonlinear circuit which is not a residual image is removed so as to effect the noise reduction effectively.

When the input picture signal is moved in the longitudinal direction, the nonlinear circuit output processing level for processing the output components of the Hadamard transform conversion showing the longitudinal detail component is lowered as shown in FIG. 6, the output processing level of the nonlinear circuit for processing the other components is raised as shown in FIG. 7 so as to effect the S/N improvement effectively, and further to prevent the input images from being deteriorated. When the input picture signal is moved only in the lateral direction, the processing level of the nonlinear circuit for processing the output component of the Hadamard transform showing the detail component in the lateral direction is lowered as shown in FIG. 6. The output processing level of the nonlinear circuit for processing the other components is raised as shown in FIG. 7 to effect the S/N improvement effectively so as to prevent the input images from being deteriorated. Since the signal extracted by the nonlinear processing circuit 9 which has received the control from such a system controller 62 is adapted to be obtained by the Hadamard transform conversion, it is returned to the original time axis by passing it through the inverse Hadamard transform converting circuit 10, where a parallel digital noise signal may be obtained. In the parallel - serial converting circuit 11, the parallel digital noise signal is turned into a serial digital signal as in the input signal. The obtained here is one in which the noise component is only extracted from the frame difference signal which does not have a frame correlation, and is fed to the subtracting circuit 3 as described hereinabove. By the drawing of the noise component from the input luminance signal, the digital luminance signal which has no noise is provided. The digital picture signal is converted into the original analog signal and outputted by the A/D converter 12.

In the present embodiment, the same thing may be carried out even with a field memory although the frame memory has been used.

Embodiment 5

Figure 9:
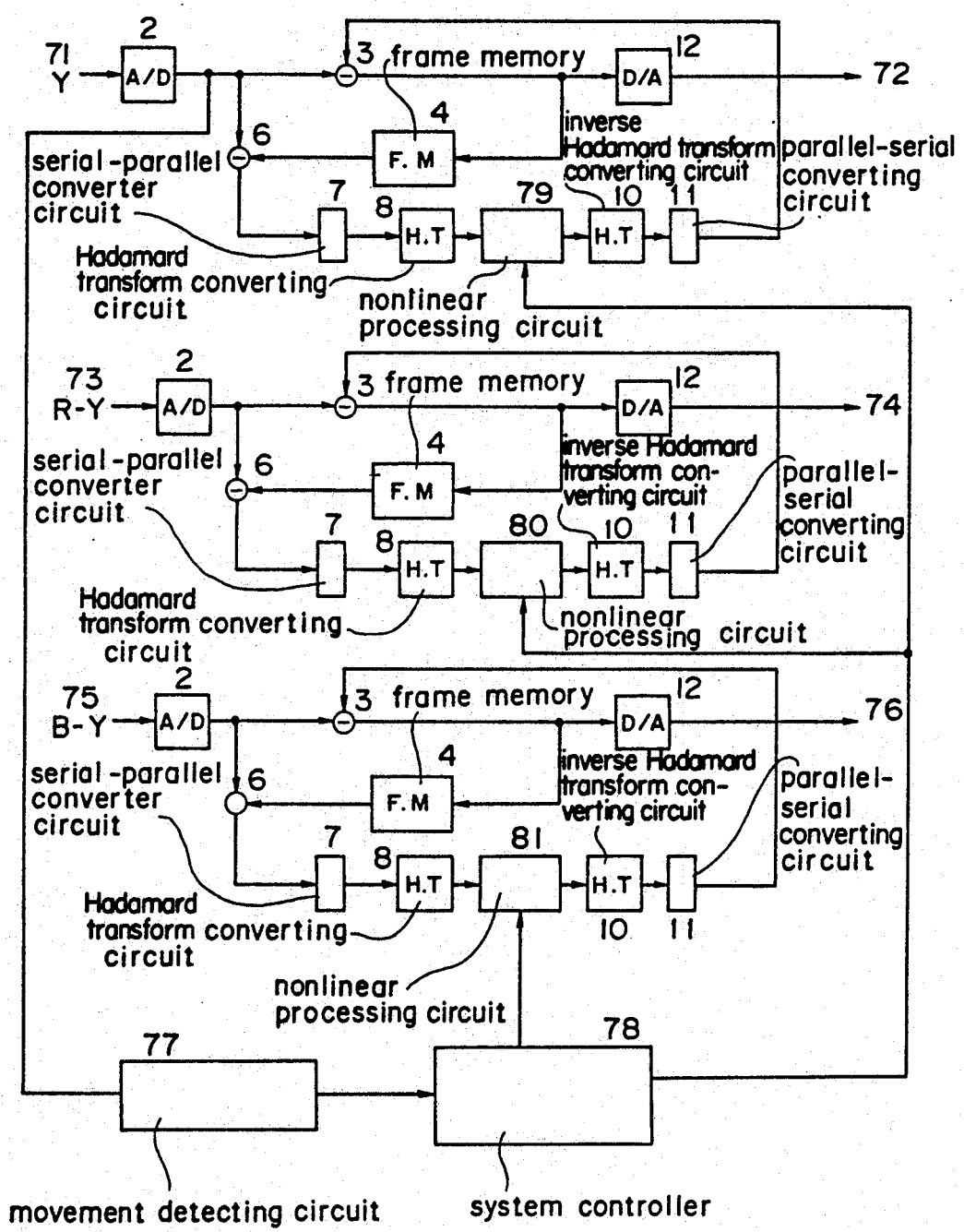
FIG. 9 is a block diagram of a noise reducing apparatus in accordance with a fifth embodiment of the present invention.

FIG. 9 shows the circuit diagram of a noise reducing apparatus in accordance with a fifth embodiment. In FIG. 9, elements 2 through 12 are similar to elements 2 through 12 in FIG. 8, and have the same functions. Element neural 71 is an input terminal for inputting the luminance signal as the component signal. Element neural 72 is an output terminal thereof. Element numeral 73 is an input terminal for inputting the R - Y signal of the component signal. Element numeral 74 is an input terminal. Element numeral 75 is an input terminal for inputting the B - Y signal of the component signal. Reference numeral 76 denotes the output terminal thereof. Element 77 is a movement detecting circuit for detecting from the input luminance signal the moving amount of the input signal. Reference numeral 78 denotes a system controller for controlling the output processing level of the respective nonlinear circuit with the moving amount. Reference numerals 79, 80, 81 denotes the nonlinear circuits for taking out the noise level from the output of the Hadamard transform converting circuit.

The operation of the noise reducing apparatus in the present embodiment constructed as described hereinabove is described hereinafter. When the luminance signal, R - Y signal, B - Y signal of the component picture signals are inputted from the input terminals 71, 73, and 75, the signal is sampled by 4 fsc (3 fsc may be considered) by the A/D converter 2, and is converted from a analog signal into a digital signal. The signal enters the following signal processing system. The non-correlated component to be described later is subtracted by passing through the subtracter 3, and the signal a signal component which does not include the noise component. Each signal component is stored into the frame memory 4, and is delayed by one frame and the frame difference signal of two signals is obtained by the subtracter 6. Each frame difference signal becomes a signal is obtained with a signal component which has no frame correlation and the noise component being combined. The frame difference signal is converted into a parallel digital signal from a serial digital signal by the serial - parallel converter 7. The frame signal is divided into a low-pass frequency component, a longitudinal direction frequency component and the lateral direction frequency component and so on in the Hadamard transform converting circuit 8. Since the noise which is included in each frame difference signal has no correlation, it is dispersed approximately equally in the frequency distribution of eight components of the output of the Hadamard transform converting circuit 8. Since the noise level in the output of the Hadamard transform converting circuit 8 corresponds to the noise level of the input signal as known, only the noise component of the small level may be eliminated from the respective components through the respective nonlinear processing circuits 79, 80, and 81.

The output from the A/D converter 2 is put to the movement detecting circuit 77 so as to obtain the moving information as to whether the input picture signal is a still picture or a moving picture or whether the movement is fast or slow or the like when the input picture signal is the moving picture. The moving information is inputted into the system controller 78. The system controller 81 controls the characteristics of the linear processing circuits 79, 80, and 81 in accordance with the moving amount. Since a recursive filter is used in the noise reducing apparatus, the noise reducing effect is good since the level of the characteristics of the respective nonlinear circuits 79, 80, 81 is larger, (at a level which does not exceed 1) in the still picture. But when the input picture is the moving image, the residual images are likely to be produced as the level of the respective nonlinear circuits is larger as the recursive filter is used. Also, the movement of the moving image is faster where the input image is the moving image, so that the residual images are likely to appear in the output signal. The system controller 78 explained before receives the information of the moving detecting circuit 77 to change so that the output characteristics of the respective nonlinear circuits may become high as shown in FIG. 7 in the case of the input images having a slow moving amount, to change so that the respective nonlinear circuit output characteristics may become low as shown in FIG. 6 in the case of the input images having a fast moving amount so as to effect the noise removing operation without any deterioration in the input images. Since the respective component signal, the luminance signal, the R - Y signal, the B - Y signal extracted by the nonlinear processing circuits 79, 80, and 81 which have received the control from such a system controller 78 are obtained from the Hadamard transform conversion, they are restored to the original time axis by the passing through the inverse Hadamard transform converting circuit 10 so as to obtain the parallel digital noise signal. In the parallel - serial converting circuit 11, the parallel digital noise signal is turned into a serial digital signal as in the input signal. Each signal obtained here is one in which the noise component is only extracted from the frame difference signal which does not have the frame correlation, and is fed to each subtracting circuit 3 as described hereinabove. By the drawing of the noise component from the input luminance signal, the luminance signal, the R - Y signal, the B - Y signal which are the digital signal having no noise are provided. The digital image signal is converted into the original analog signal and outputted by each A/D converter.

In the present embodiment, the same thing may be carried out even with a field memory although the frame memory has been used.

Embodiment 6

Figure 10:
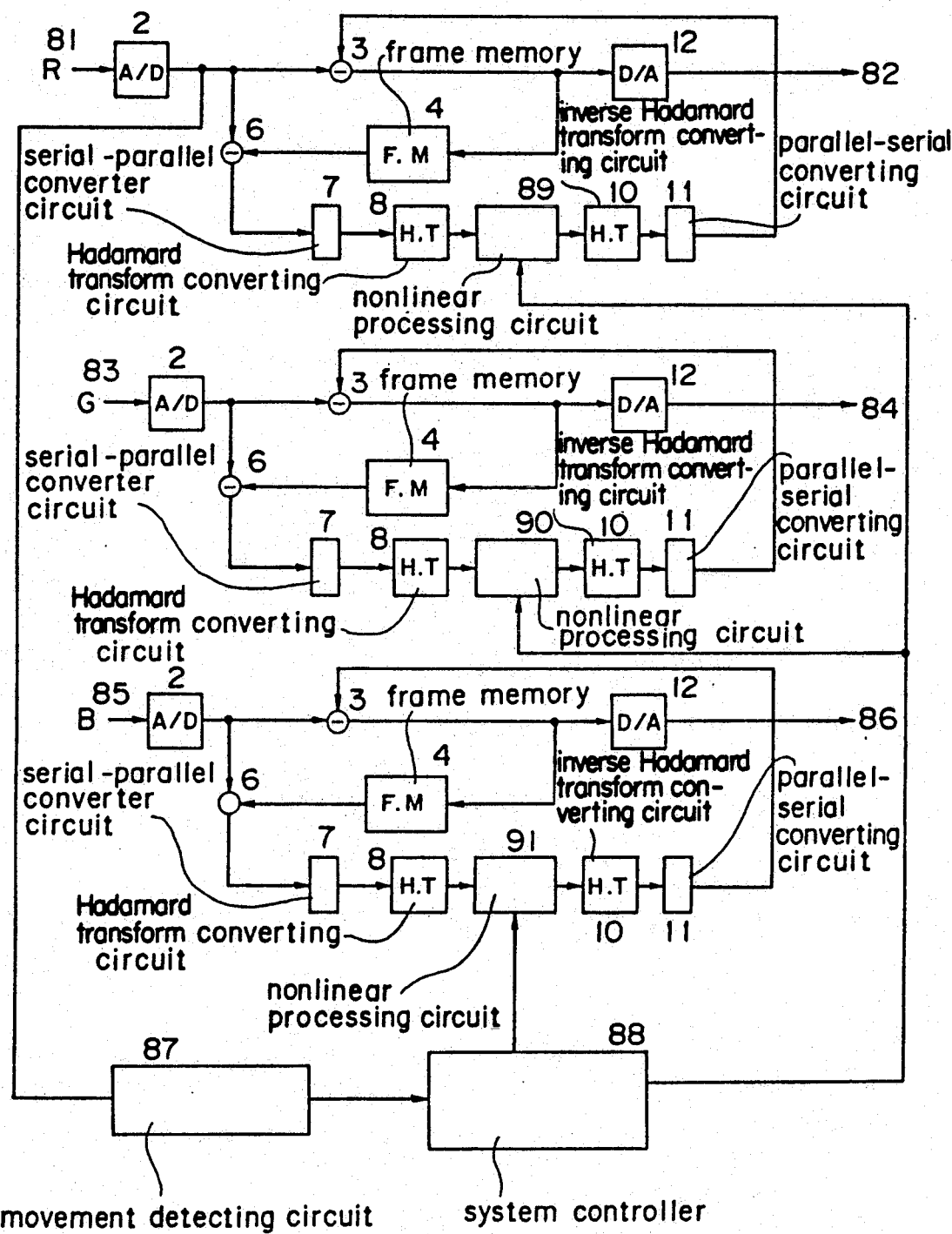
FIG. 10 is a block diagram of a noise reducing apparatus in accordance with a sixth embodiment of the present invention.

In the embodiment 6, as the component signal, the R signal, G signal, B signal inputting operation are considered. The block diagram thereof is shown in FIG. 10.

Embodiment 7

Figure 11:
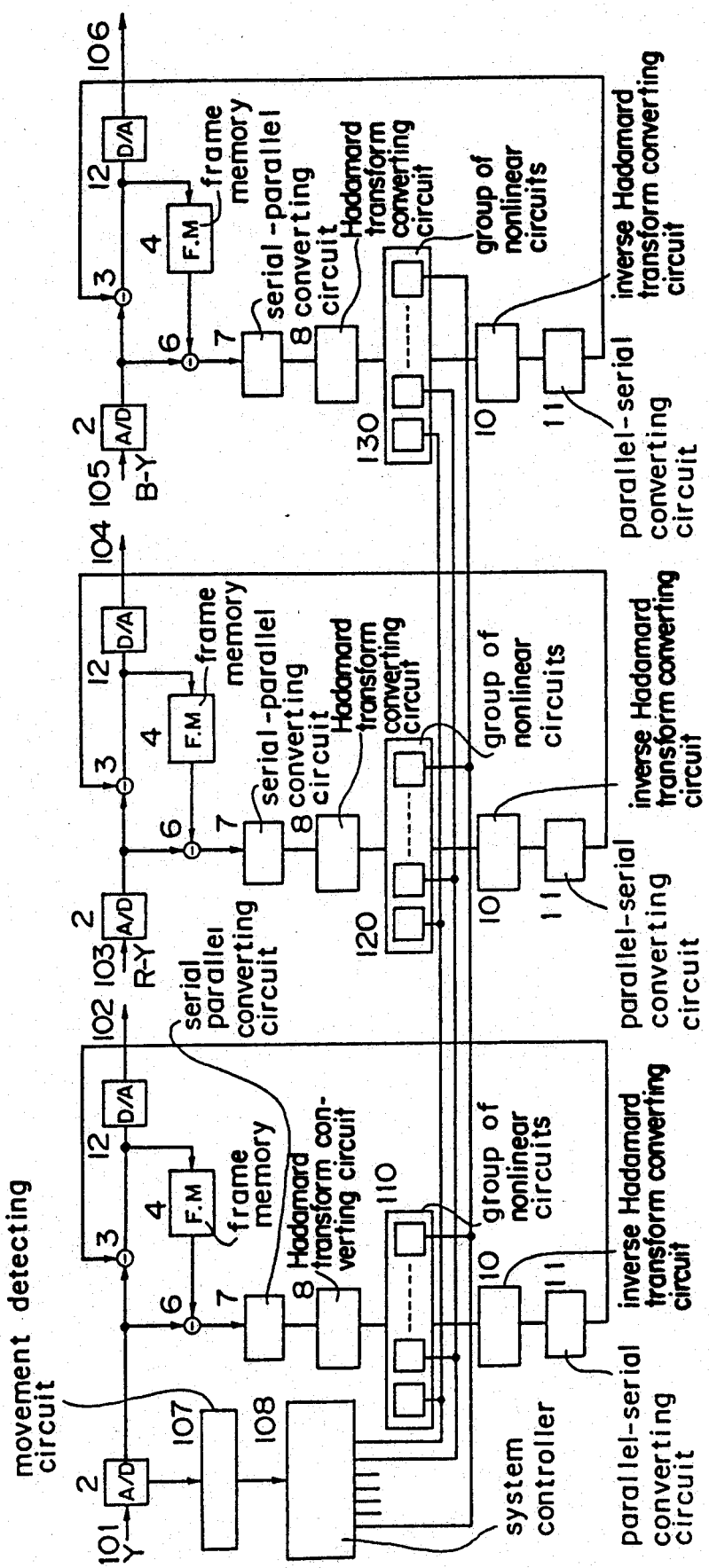
FIG. 11 is a block diagram of a noise reducing apparatus in accordance with a seventh embodiment of the present embodiment.
Figure 12:
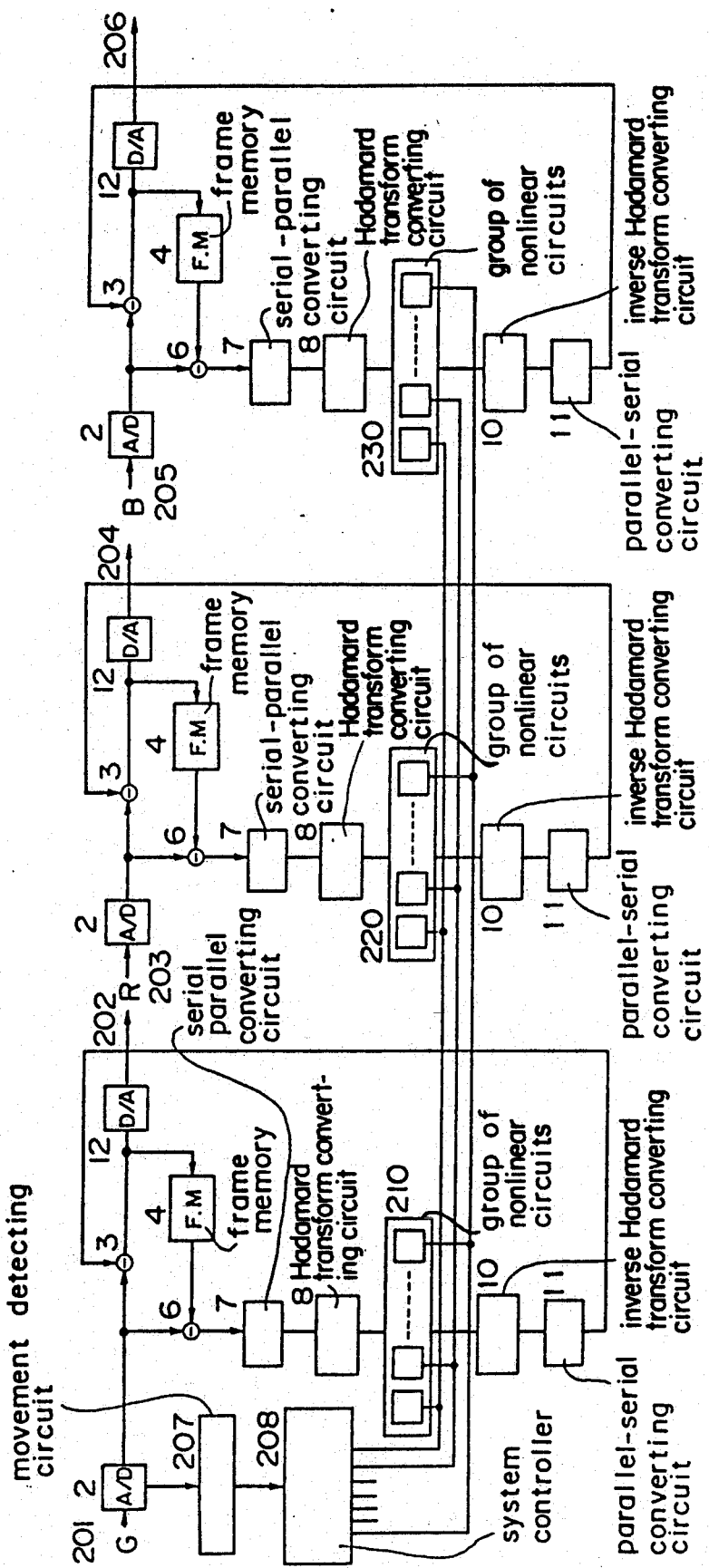
FIG. 12 is a block diagram of a noise reducing apparatus in accordance with an eight embodiment of the present invention.

FIG. 11 shows a circuit diagram of a noise reducing apparatus in accordance with a fifth embodiment of the present invention. The nonlinear circuits of the fifth embodiment are a plurality of nonlinear circuits. In FIG. 11, elements 2 through 12 are similar to elements 2 through 12 shown in FIG. 13, and have the same functions. Reference numeral 101 denotes an input terminal for inputting the luminance signals as the component signals. Reference numeral 102 denotes the output terminal thereof. Reference numeral 103 denotes an input terminal for inputting the R - Y signal of the component signal. Reference numeral 104 denotes the output terminal thereof. Reference numeral 105 denotes an input terminal for inputting the B - Y signal of the component signal. Reference numeral 106 denotes the output terminal thereof. Reference numeral 107 denotes a moving detecting circuit for detecting the moving amount of the input signal from the input luminance signal. Reference numeral 108 denotes a system controller for controlling the output processing level of the respective nonlinear circuit by the moving amount. Reference numerals 110, 120, and 130 denotes groups of nonlinear circuits for eliminating the noise level from the output of the Hadamard transform converting circuit.

The operation of the noise reducing apparatus in the present embodiment constructed as described hereinabove is described hereinafter. When the luminance signal, R - Y signal, B - Y signal of the component picture signals are inputted to the input terminals 101, 103, 105, the signal is sampled by 4 fsc (3 fsc may be considered) by each A/D converter 2, and is converted from an analog signal to a digital signal. The signal enters each of the following signal processing system. The non-correlated component to be described later is subtracted by passing through the subtracter 3, and the signal ideally becomes a signal component which does not include the noise component. Each signal component is stored into the frame memory 4, and is delayed by one frame; the frame difference signal of two signals is obtained by the subtracter 6. Each frame difference signal becomes a signal with a signal component which has no frame correlation and the noise component being combined. The frame difference signal is converted into a parallel digital signal from the serial digital signal by the serial - parallel converter 7. The frame difference signal is divided into a low-pass frequency component, a longitudinal direction frequency component and a lateral direction frequency component and so on in the Hadamard transform converting circuit 8. Since the noise which is included in each frame difference signal has no correlation, it is dispersed approximately equally in the frequency distribution of eight components of the output of the Hadamard transform converting circuit 8. Since the noise level in the output of the Hadamard transform converting circuit 8 corresponds to the noise level of the input signal, only a noise component of the small level may be eliminated from the respective components through the respective nonlinear processing circuit groups 110, 120, and 130.

The output from the A/D converter 2 of the luminance signal input is put to the movement detecting circuit 107 so as to obtain the comprehensive moving information as to whether the input picture signal is a still picture or a moving picture or whether the movement is fast or slow or whether the moving direction is longitudinal or lateral or the like when the input picture signal is the moving picture. The moving information is inputted into the system controller 108. The system controller 108 controls the respective nonlinear processing characteristics of a plurality of nonlinear circuit groups 110, 120, and 130 in accordance with the moving amount, the moving direction and so on. Since the recursive filter is used in the component noise reducing apparatus, the noise reducing effect is good since the levels of the characteristics of nonlinear circuits 110, 120, and 130 are larger (at a level which does not exceed 1) in the still picture. But when the input picture is a moving image, the residual images are likely to be produced since the level of nonlinear processing characteristics is larger since the recursive filter is used. Also, the movement of the moving image is faster where the input image is the moving image, so that the residual images are likely to appear in the output signal. The Hadamard transform converted frame difference signal is analyzed into eight components as described hereinabove. The respective eight components become a low-pass component, a longitudinal direction detail component, a lateral direction detail component, an oblique direction component so as to show the value corresponding to the moving amount of the input signal.

The movement detecting circuit 107 detects whether the input picture signal is a moving image or a still image, the movement is longitudinal or lateral, the movement is fast or slow when the signal is a moving image, and so on to send the moving information of the input picture signal to the system controller 108. The system controller 108 controls the levels of the processing characteristics of the respective nonlinear processing circuits of a plurality of nonlinear circuit groups 110, 120, and 130 from the moving amount and the movement direction of the input picture signal which is the output of the moving detecting circuit. When the component input picture signal is a still image, the system controller 108 increases the output processing level of the respective circuits of the nonlinear circuit groups 110, 120, and 130 as described in FIG. 7. When the input picture signal is the moving image, the system controller 108 reduces the output processing levels of the respective circuits of the nonlinear circuits 110, 120, and 130 as shown in FIG. 6. The value of the nonlinear circuit is varied through the moving amount of the input signal in this manner so as to effect the S/N improvement more when the movement is less. When the moving amount is more, the output of the nonlinear circuit which does not produce the residual image is removed so as to effect the noise reduction effectively. When the component input picture signal is moved in the longitudinal direction, the nonlinear circuit output processing level for processing the output components of the Hadamard transform conversion showing the longitudinal detail component is lowered as shown in FIG. 6, the output processing level of the nonlinear circuit for processing the other components is raised as shown in FIG. 7 so as to effect the S/N improvement effectively, and further to prevent the input images from being deteriorated. When the input picture signal is moved only in the lateral direction, the processing level of the nonlinear circuit for processing the output component of the Hadamard transform conversion showing the detail component in the lateral direction is lowered as shown in FIG. 6. The output processing level of the nonlinear circuit for processing the other components is raised as shown in FIG. 7 to effect the S/N improvement effectively so as to prevent the input images from being deteriorated.

Since the respective signals extracted by the nonlinear processing circuit groups 110, 120, and 130 which have received the control from the system controller 108 are adapted to be obtained by the Hadamard transform conversion, they are returned to the original time axis by the passing through each inverse Hadamard transform converting circuit 10, where the parallel digital noise signal may be obtained. In the parallel - serial converting circuit 11, the parallel digital noise signal is turned into a serial digital signal as in the input signal. As each of the component signals signal obtained here is one extracted by the noise component only from the frame difference signal which does not have frame correlation, and is fed into the subtracting circuit 3 as described hereinabove. By the drawing of the noise component from the input luminance signal, the digital luminance signal which has no noise is provided. The digital picture is converted into the original analog signal and outputted by each A/D converter.

In the present embodiment, the same thing may be carried out even with the field memory although the frame memory is used.

Embodiment 8

In the embodiment 8, as the component signals there are considered R signal, G signal, B signal inputs. The block diagram thereof is shown in FIG. 13.

Although the present invention has been fully described by way of example with reference to the accompanying drawings it is to be noted here that various changes and modifications will be apparent to those skilled in the art. Therefore, unless otherwise such changes and modifications depart from the scope of the present invention, they should be construed as included therein.

What is claimed is:

1. A noise reducing apparatus comprising:
   a first subtracting means for obtaining a difference between an input picture signal and an output signal of an n (n>0: wherein n is an integer) field delaying means;
   a characteristic extracting means for extracting a characteristic component of an output signal of said first subtracting means;
   a nonlinear processing means for eliminating a noise component from an output of said characteristic extracting means;
   a second subtracting means for obtaining a difference between an output of said nonlinear processing means and the input picture signal;
   said n field delaying means delaying by an n field portion an output of said second subtracting means, wherein said nonlinear processing means outputs an output signal which is a product of input signal multiplied by constant i (wherein i>0) when the input signal is at or less than a reference level a (a>0) or less and when the input signal is at or more than a reference level b (b<0), and wherein said nonlinear processing means outputs an approximately constant value A when the input signal is at or more than the reference level a and outputs an approximately constant value B when the input signal is at or less than the reference level b.

2. A noise reducing apparatus comprising:
a first subtracting means for obtaining a difference between an input picture signal and an output signal of an n (n>0): wherein n is an integer) field delaying means;
a characteristic extracting means for separating a first subtracting means output into a plurality of (N number (N≠1)) characteristic components;
a plurality of nonlinear processing means for eliminating a noise component from each of a plurality of characteristic components output of said characteristic extracting means;
a second subtracting means for obtaining a difference between an output of said nonlinear processing means and the input picture signal; said n field delaying means delaying by an n field portion an output of said second subtracting means, wherein said plurality of nonlinear processing means outputs an output signal which is a product of input signal multiplied by a constant in (wherein n>0) when the input signal of each nonlinear processing means is at or less than a reference level an (an>0), and when the input signal is at or more than a reference level bn (bn<0) and outputs an approximately constant value An when the input signal is at or more than a reference level an, and wherein said nonlinear processing means outputs an approximately constant value Bn when the input signal is a t or less than a reference level, and at least one of said plurality of nonlinear processing means have values, including at least one of the reference levels an, bn, constant in, approximately constant values An, Bn, which are different from those of another of said plurality of nonlinear processing means.

3. A noise reducing apparatus which inputs a picture signal through a noise removing means, the noise removing means comprising:
a delaying means for delaying the input picture signal by a certain unit time;
a first subtracting circuit for obtaining a difference between the input picture signal and the delayed picture signal;
a signal characteristics extracting means for separating the difference signal into signal components showing the characteristics thereof;
a noise extracting means for extracting noise from an output of said characteristics extracting means;
a means for obtaining moving information of the input picture signal from said difference signal of the input picture signal and an n (n>0) field delayed input picture signal by filtering in a finite region including a current pixel;
a means for controlling said characteristics extracting means so that an output level of said means for extracting he characteristics is small when the obtained moving information is large, and the output level of the means for extracting characteristics is large when the moving information is small;
a second subtracting circuit for subtracting the output signal of the noise extracting means from the input picture signal.

4. A noise reducing apparatus having a plurality of independent noise removing means for each of respective component signals composing an input picture signal, the noise removing means comprising:
a means for delaying by a certain unit time each respective component signal;
a first subtracting circuit for obtaining a difference between the input component signal and the delayed component signal;
a signal characteristics extracting means for separating the difference signal into signal components showing the characteristics thereof;
a noise extracting means for extracting noise from an output of the characteristics extracting means;
a means for obtaining moving information of the input picture signal from the difference signal of the input picture signal and an n (n>0) field delayed input picture signal by filtering in a finite region including a current pixel;
a means for controlling said characteristics extracting means so that an output level of the means for extracting he characteristics is small when the obtained moving information is large, and the output level of a means for extracting he characteristics is large when the moving information is small;
a second subtracting circuit for subtracting the output signal of the noise extracting means from the input component signal.

5. A noise reducing apparatus as recited in claim 4, where a plurality of components composing an input picture signal are a luminance signal and two color difference signals.

6. A noise reducing apparatus as recited in claim 4, where a plurality of components comprising an input picture signal are R signal, B signal, G signal.

7. A noise reducing apparatus as recited in claim 3, wherein the noise extracting means has linear characteristics up to a certain level in absolute value, and has a proportional relationship with respect to the input, and wherein the output is approximately constant at a certain constant level or more in absolute value, and changes the level of the certain constant level in accordance with the moving information.

8. A noise reducing apparatus as recited in claim 3, where the noise extracting means has of nonlinear characteristics up to a certain level in absolute value, and has approximately a proportional relationship with respect to the input, and changes the level of the certain level in accordance with the moving information.

* * * * *